US008584176B2

(12) United States Patent
Chen

(10) Patent No.: US 8,584,176 B2
(45) Date of Patent: Nov. 12, 2013

(54) COMMUNICATING VIDEO CONTENT

(71) Applicant: AT&T Intellectual Property I, L.P., Atlanta, GA (US)

(72) Inventor: Wenge Chen, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/661,163

(22) Filed: Oct. 26, 2012

(65) Prior Publication Data

US 2013/0074128 A1 Mar. 21, 2013

Related U.S. Application Data

(63) Continuation of application No. 12/545,200, filed on Aug. 21, 2009, now Pat. No. 8,332,888, which is a continuation of application No. 11/283,545, filed on Nov. 18, 2005, now Pat. No. 7,596,799.

(51) Int. Cl.
*H04N 21/4722* (2011.01)
*H04N 21/482* (2011.01)

(52) U.S. Cl.
USPC .................. 725/61; 725/37; 725/38; 725/39

(58) Field of Classification Search
None
See application file for complete search history.

(56) References Cited

U.S. PATENT DOCUMENTS

| 1,338,607 | A | 4/1920 | Bell |
| 5,589,892 | A | 12/1996 | Knee et al. |
| 5,815,145 | A | 9/1998 | Matthews, III |
| 6,760,918 | B2 | 7/2004 | Rodriguez et al. |
| 7,073,189 | B2 | 7/2006 | McElhatten et al. |
| 7,117,440 | B2 | 10/2006 | Gordon et al. |
| 7,197,715 | B1 | 3/2007 | Valeria |
| 7,233,987 | B2 | 6/2007 | Watkinson |
| 7,596,799 | B2 | 9/2009 | Chen |
| 7,640,564 | B2 | 12/2009 | Green et al. |
| 8,332,888 | B2 | 12/2012 | Chen |
| 2002/0157099 | A1 | 10/2002 | Schrader et al. |
| 2003/0056220 | A1* | 3/2003 | Thornton et al. ............... 725/62 |
| 2003/0200551 | A1 | 10/2003 | Kang |
| 2003/0229900 | A1 | 12/2003 | Reisman |
| 2004/0031056 | A1 | 2/2004 | Wolff |
| 2004/0034863 | A1 | 2/2004 | Barrett et al. |
| 2004/0034864 | A1* | 2/2004 | Barrett et al. .................. 725/38 |
| 2004/0207764 | A1 | 10/2004 | Naoi et al. |
| 2005/0076366 | A1* | 4/2005 | Yoshigahara et al. .......... 725/56 |

(Continued)

OTHER PUBLICATIONS

"Video over IP," http://www.lightreading.com/documen.asp?site=lightreading&doc_id=40811, Oct. 1, 2003, pp. 1-4.

(Continued)

*Primary Examiner* — Brian Pendleton
*Assistant Examiner* — Jean D Saint Cyr
(74) *Attorney, Agent, or Firm* — Toler Law Group, PC

(57) ABSTRACT

A method includes receiving a selection of a channel at a set-top box device. In response to the selection of the channel, a still image associated with a program is displayed at a display device. The method further includes receiving a multicast stream of video content associated with the selected channel at the set-top box device. At least a portion of the multicast stream is received while the still image is displayed at the display device. The method also includes transmitting the video content to the display device.

20 Claims, 7 Drawing Sheets

(56) References Cited

U.S. PATENT DOCUMENTS

| | | |
|---|---|---|
| 2005/0081244 A1* | 4/2005 | Barrett et al. .................. 725/97 |
| 2005/0228806 A1 | 10/2005 | Haberman |
| 2006/0041907 A1* | 2/2006 | Yoon ............................... 725/40 |
| 2006/0117342 A1 | 6/2006 | Park et al. |
| 2007/0118866 A1 | 5/2007 | Chen |
| 2009/0320068 A1 | 12/2009 | Chen |

OTHER PUBLICATIONS

"Multicast," http://en.wikipedia.org/w/index.php?title=Multicast&printable=yes, Apr. 27, 2006, pp. 1-3.

"Internet Protocol IP Multicast," Internetworking Technologies Handbook, http://cisco.com/univercd/cc/td/doc/cisintwklito_doc/ipmulti.htm, Feb. 20, 2002, pp. 1-16.

Craioveanu, R., "IP Multicasting over DSL," http://archives.cnn.com/2000fTECH/computing/02/08/ip.dsl.idg/, Feb. 8, 2000, pp. 1-4.

* cited by examiner

COMMUNICATING VIDEO CONTENT

CLAIM OF PRIORITY

The present application claims priority from and is a continuation of U.S. patent application Ser. No. 12/545,200, filed on Aug. 21, 2009, issued as U.S. Pat. No. 8,332,888, and titled "COMMUNICATING VIDEO CONTENT," which claims priority from and is a continuation of U.S. patent application Ser. No. 11/283,545, filed on Nov. 18, 2005, issued as U.S. Pat. No. 7,596,799, and titled "SYSTEM AND METHOD OF COMMUNICATING VIDEO CONTENT," the contents of each of which are expressly incorporated herein by reference in their entirety.

FIELD OF THE DISCLOSURE

The present disclosure is generally related to communicating video content.

BACKGROUND

Television and films provide sources of information and entertainment to many viewers. Content providers offer a large number of channels that allow viewers to select from a wide variety of programming. Television and film content can be delivered through a variety of systems, such as broadcast networks, cable networks, and data networks. Cable networks and data networks allow providers to offer more channels than broadcast networks, because they are less dependent upon broadcast frequencies.

Viewers often change channels during commercials or when a program is scheduled to begin. Data networks, such as digital cable networks, can exhibit latency in displaying video content of a selected channel. This latency can be frustrating to viewers, especially when they desire to quickly review the content displayed on multiple channels.

DETAILED DESCRIPTION

In a particular embodiment, a method of communicating video content is disclosed that includes receiving a selection of a channel at a set-top box device. The method also includes, in response to the selection of the channel, transmitting a still image associated with a program being transmitted via the selected channel to a display device. The method further includes receiving a multicast stream of video content associated with the selected channel at the set-top box device. At least a portion of the multicast stream is received while the still image is displayed at the display device. The method includes transmitting the video content to the display device.

In another embodiment, a set-top box device is disclosed that includes a channel change module configured to receive a selection of a channel. The set-top box device also includes an image control module configured to receive a still image associated with a program being transmitted via the selected channel and to transmit the still image to a display device coupled to the set-top box device. The set-top box device further includes a video content control module configured to receive a multicast stream of video content associated with the selected channel, including receiving a portion of the multicast stream while the still image is displayed at the display device. The video content module is also configured to transmit the video content to the display device.

In another embodiment, a computer-readable storage medium is disclosed that includes instructions, that when executed by a processor, cause the processor to receive a selection of a channel at a set-top box device. The computer-readable storage medium also includes instructions, that when executed by the processor, cause the processor to transmit a still image associated with a program being transmitted via the selected channel to a display device in response to the selection of the channel. The computer-readable storage medium further includes instructions, that when executed by the processor, cause the processor to receive a multicast stream of video content associated with the selected channel at the set-top box device. At least a portion of the multicast stream is received while the still image is displayed at the display device. The computer-readable storage medium also includes instructions, that when executed by the processor, cause the processor to transmit the video content to the display device.

Figure 1:
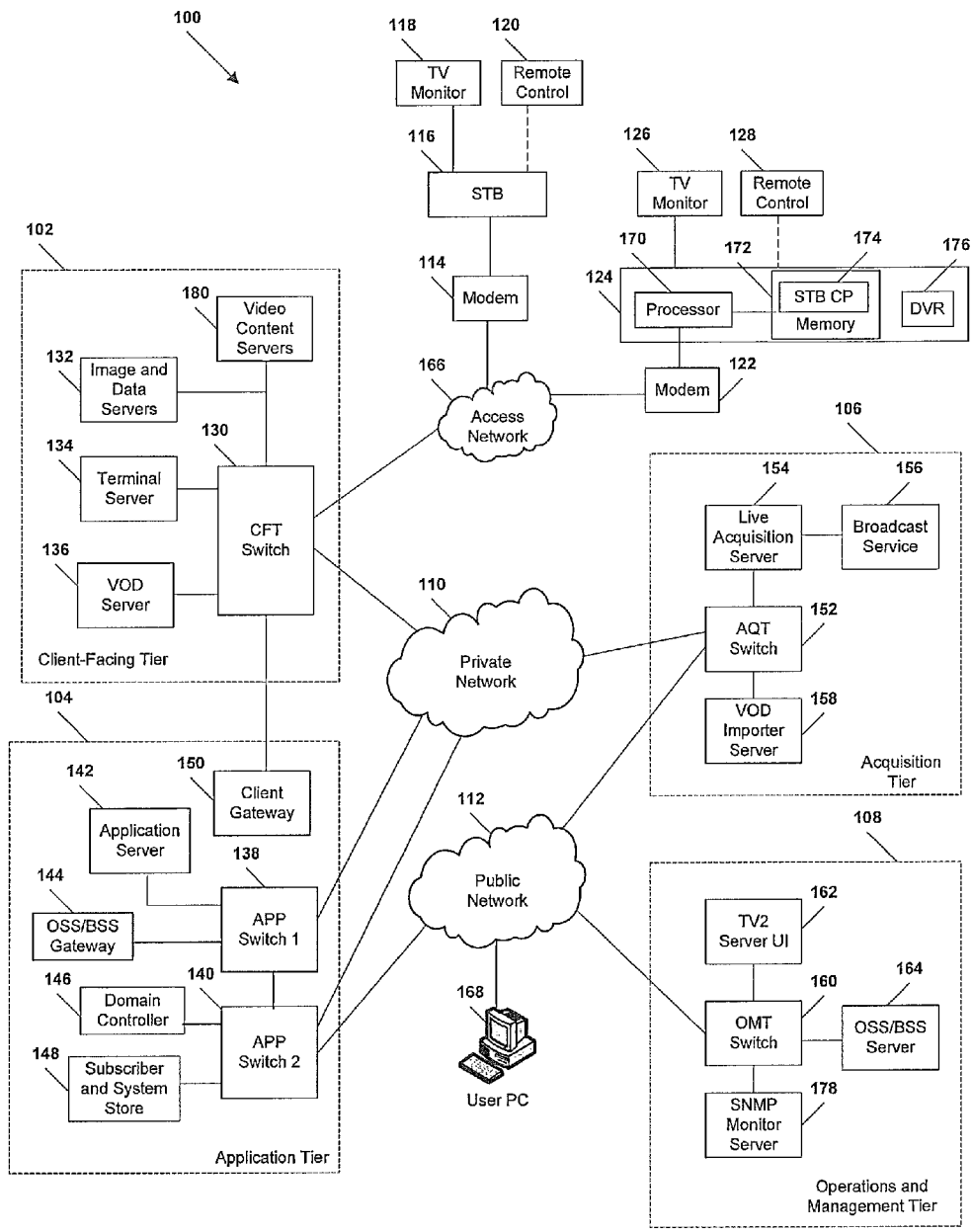
FIG. 1 is a block diagram illustrating an embodiment of an Internet Protocol Television (IPTV) system.

Referring to FIG. 1, an illustrative embodiment of an Internet Protocol Television (IPTV) system that may be used to provide video content is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV) access network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that can be supported by networking the client-facing tier 102 to numerous set-top box devices. In an illustrative embodiment, the client-facing tier, or any portion thereof, can be included at a video head-end office.

In a particular embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device can communicate with a second remote control 128.

In an exemplary, non-limiting embodiment, each set-top box device 116, 124 can receive video content, which may include video and audio portions, from the client-facing tier 102 via the private access network 166. The set-top boxes 116, 124 can transmit the video content to an external display device, such as the television monitors 118, 126. Further, the set-top box devices 116, 124 can each include a STB processor, such as STB processor 170, and a STB memory device, such as STB memory 172, which is accessible to the STB processor 170. In one embodiment, a computer program, such as the STB computer program 174, can be embedded within the STB memory device 172. Each set-top box device 116, 124 can also include a video content storage module, such as a digital video recorder (DVR) 176. In a particular embodiment, the set-top box devices 116, 124 can communicate commands received from the remote control devices 120, 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more image and data servers 132 that store still images associated with programs of various IPTV channels. The image and data servers 132 can also store data related to various channels, e.g., types of data related to the channels and to programs or video content displayed via the channels. In an illustrative embodiment, the image and data servers 132 can be a cluster of servers, each of which can store still images, channel-related data, program-related data, or any combination thereof. The CFT switch 130 can also be coupled to a terminal server 134 that provides terminal devices with a connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers to their set-top boxes 116, 124. In an illustrative, non-limiting embodiment, the video content servers 180 can include one or more multicast servers.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

Further, the second APP switch 140 can be coupled to a domain controller 146 that provides web access, for example, to users via the public network 112. For example, the domain controller 146 can provide remote web access to IPTV account information via the public network 112, which users can access using their personal computers 168. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly with the client-facing tier 102. In this embodiment, the client gateway 150 can be coupled directly to the CFT switch 130. The client gateway 150 can provide or restrict access to the private network 110 and the tiers coupled thereto.

In a particular embodiment, the set-top box devices 116, 124 can access the IPTV system 100 via the private access network 166, using information received from the client gateway 150. In this embodiment, the private access network 166 can provide security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. In one embodiment, the OSS/BSS gateway 144 can transmit a query via the first APP switch 138, to the second APP switch 140, and the second APP switch 140 can communicate the query via the public network 112 to the OSS/BSS server 164. After the client gateway 150 confirms subscriber and/or billing information, the client gateway 150 can allow the set-top box device 116 to access IPTV content and VOD content. If the client gateway 150 cannot verify subscriber information for the set-top box device 116, e.g., because it is connected to an unauthorized twisted pair, the client gateway 150 can block transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television or movie content, for example, from a broadcast service 156. In a particular embodiment, the live acquisition server 154 can transmit the television or movie content to the AQT switch 152, and the AQT switch 152 can transmit the television or movie content to the CFT switch 130 via the private network 110.

Further, the television or movie content can be transmitted to the video content servers 180, where it can be encoded, formatted, stored, replicated, or otherwise manipulated and prepared for communication to the set-top box devices 116, 124. The CFT switch 130 can communicate the television or movie content to the modems 114, 122 via the private access network 166. The set-top box devices 116, 124 can receive the television or movie content via the modems 114, 122, and can transmit the television or movie content to the television monitors 118, 126. In an illustrative embodiment, video or audio portions of the television or movie content can be streamed to the set-top box devices 116, 124.

Further, the AQT switch can be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the private access network 166 to the VOD server 136, via the CFT switch 130. Upon receiving such requests, the VOD server 136 can retrieve the requested VOD content and transmit the content to the set-top box devices 116,124 across the private access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In an illustrative embodiment, the live acquisition server 154 can transmit the television or movie content to the AQT switch 152, and the AQT switch 152, in turn, can transmit the television or movie content to the OMT switch 160 via the public network 112. In this embodiment, the OMT switch 160 can transmit the television or movie content to the TV2 server 162 for display to users accessing the user interface at the TV2 server 162. For example, a user can access the TV2 server 162 using a personal computer (PC) 168 coupled to the public network 112.

In a particular embodiment, the CFT switch 130 can include logic to communicate with one or more set-top box devices, such as the second representative set-top box device 124, in order to receive a selection of a channel. The CFT switch 130 can transmit the channel selection received from the set-top box 124 to one or more of the image and data servers 132. The image and data servers 132 can include logic to determine a program displayed or to be displayed via the selected channel, and to retrieve a still image associated with the program and data associated with the selected channel. The image and data servers 132 can transmit the retrieved still image and data to the CFT switch 130, which transmits the still image and data to the set-top box device 124 for display at the display device 126.

In an illustrative embodiment, the still images stored at the image and data servers 132 can include images associated with television programs on a one-to-one basis. For example, a first image can be associated with a first program such as NOVA; a second image can be associated with a second program such as M.A.S.H.; a third image can be associated with a third program such as ER, and so on. In another embodiment, one or more still images can be associated with multiple programs of a single channel, on a one-to-many basis. For instance, a first image could be associated with a plurality of prime time shows on a channel; a second image could be associated with a plurality of football games on a channel; and a third still image could be associated with a plurality of overnight programs or infomercials on a channel. In yet another embodiment, still images can be associated with one or more programs of multiple channels, such as an image associated with all syndicated episodes of Seinfeld, no matter the episode or channel; or an image associated with a live State of the Union address displayed via multiple channels. In another example, a single image could be associated with a single channel, such as a channel that only supplies weather information or news.

In one embodiment, a still image can be retrieved by one or more of the image and data servers 132, based on the selected channel and the time of the selection. The still image can be retrieved by determining a time of a selection and which program is displayed on the selected channel at the determined time. Once the program is identified, a still image associated with the program can be retrieved. Alternatively, a bank of still images associated with programs running on each channel can be regularly updated at one or more of the image and data servers 132, such that a still image is retrieved from the bank of still images based on the selected channel. In one embodiment, the bank of still images can be updated by monitoring changes in an electronic program guide (EPG) that is generated by the video content servers 180 or one or more other servers, and by maintaining a bank of still images corresponding to programs shown at a time slot on the EPG.

Data related to channels can include, for example, a channel identifier, such as Channel 9; or a network identifier, such as PBS. The data can also include data related to current or future programs on the channel, e.g., a program name, such as a program title or episode name; a type of program, such as a news program, a science program, or a sports program; a program audience rating, such as general audience (G), parental guidance (PG), restricted (R), or mature audiences (MA); an elapsed program time, such as eleven minutes; a remaining program time, such as forty-nine minutes; a program start time, such as 7:00 pm; a program end time, such as 8:00 pm; a program summary or synopsis; a main actor name, such as Jerry Seinfeld; a program host name, such as a game show host name, a talk show host name, or a documentary narrator name; a program viewership, such as a number of households viewing the program; a video-on-demand availability indicator; or any combination thereof. In a particular embodiment, the data can be stored as separate data items, and a user may determine which data items are transmitted to the set-top box device 124 by the CFT switch 130 or which data items are included in a graphical user interface (GUI) transmitted from the set-top box device 124 to the television monitor 126.

In a particular embodiment, the CFT switch 130 can include logic to transmit the channel selection received from the set-top box device 124 to the video content servers 180. The video content servers 180 can transmit video content corresponding to the selected channel to the CFT switch 130, which transmits data corresponding to the video content to the set-top box device 124 for display at the television monitor 126. In an illustrative embodiment, the video content servers 180 can associate the set-top box device with a multicast group corresponding to the selected channel.

In a particular embodiment, the set-top box device 124 can include a buffer that receives data corresponding to the video content. The set-top box device 124 can include logic to transmit the video content to the television monitor 126 when a proportion of the buffer is filled, in order to prevent underflow. Alternatively, the set-top box device 124 can include logic to communicate with the remote control 128, for example, to receive an accept channel command or a refuse channel command. In one embodiment, the set-top box device 124 can begin transmitting video content to the television monitor 126 when it receives an accept channel command and a buffer threshold is satisfied. On the other hand, if the set-top box device receives a refuse channel command, it can transmit the refuse channel command and a prior channel indicator to the CFT switch 130 via the private access network 166. The CFT switch 130 can transmit the refuse channel command and prior channel indicator to the video content servers 180, and the video content servers 180 can transmit video content of the prior channel to the CFT switch 130, which transmits the video content to the set-top box device 124 via the private access network 166. In another embodiment, the set-top box device 124 can issue of a selection of a prior channel to the CFT switch 130 in response to a refuse channel command.

Figure 2:
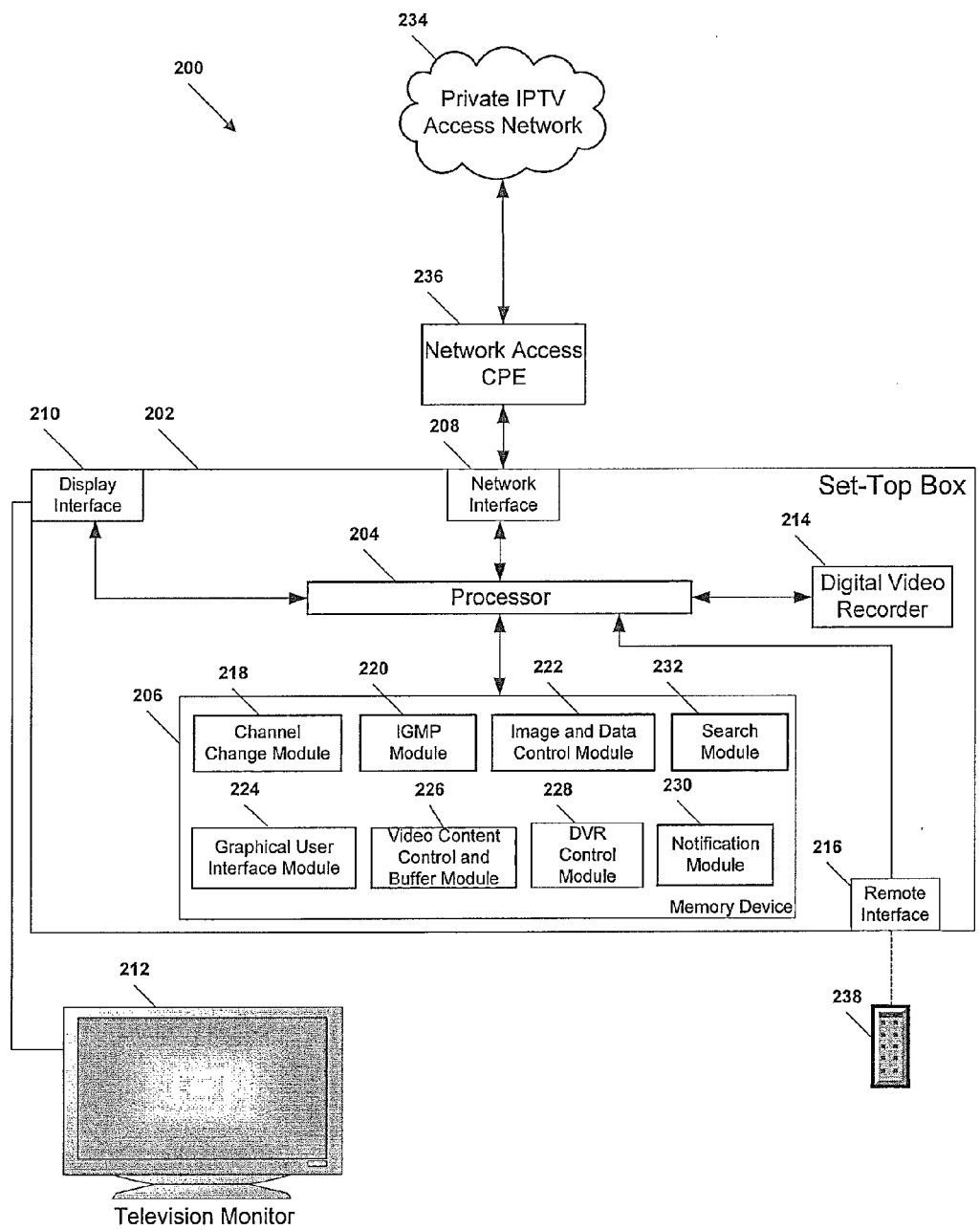
FIG. 2 is a block diagram illustrating an embodiment of a system to communicate and process video content.

Referring to FIG. 2, an embodiment of a system to communicate and process video content is illustrated and designated generally at 200. The system includes a set-top box 202 that contains a processor 204. A memory device 206 is accessible to the processor 204. Additionally, the processor 204 is coupled to a network interface 208. Further, the processor 204 can be coupled to a display interface 210, such as a television interface, through which the set-top box device 202 can communicate video content to an external display device, such as a television monitor 212. In addition, the processor 204 can communicate with a remote control device 238, via a remote control interface 216.

The processor 204 can communicate with an external access network, such as a private Internet Protocol Television (IPTV) access network 234, via the network interface 208. In an illustrative embodiment, network access customer premises equipment 236 can facilitate communication between the network interface 208 and the private IPTV access network 234. The network access CPE 236 can include a router, local area network device, a modem, such as a digital subscriber line (DSL) modem, any other suitable device for facilitating communication between the network interface 208 of the set-top box device 202 and the private IPTV access network 234, or any combination thereof.

In a particular embodiment, the memory device 206 can include logic or instructions configured to provide a variety of functions. The logic or instructions can be included, for example, in one or more hardware or software modules, such as the modules 218-232. One or more of the modules 218-232 can be included within a single memory device, such as the memory device 206; within a single processor; or any combination thereof. In one embodiment, the memory device 206 can include a channel change module 218 configured to communicate with the remote control device 238 via the remote control interface 216, for example, to receive a selection of a channel. The channel change module 218 is configured to communicate the selection to an IPTV system via the private IPTV access network 234. In an illustrative embodiment, the channel change module 218 can direct an Internet Group Management Protocol (IGMP) module 220 to issue a join command or IGMP report to the IPTV system requesting that the set-top box device 202 be added to a multicast group associated with the selected channel.

In a particular embodiment, the channel change module 218 can be configured to communicate with the remote control device 238 to receive an accept channel command or a refuse channel command. The channel change module 218 can be configured to communicate a command or signal to the video content control and buffer module 226 to transmit video content corresponding to a selected channel to the display interface 210, when the channel change module 218 receives an accept channel command. Additionally, the channel change module 218 can be configured to communicate a refuse channel command or a selection of a prior channel to the IPTV system via the private IPTV access network 234. In an illustrative embodiment, the channel change module 218 can be configured to store a prior channel indicator when it receives a channel selection from the remote control device 238 and to communicate the prior channel indicator to the IPTV system via the private IPTV access network 234 with the refuse channel command.

In an illustrative embodiment, the channel change module 218 can be configured to issue a command or signal to a video content and buffer module 226 to empty video content in the buffer when a selection of a channel or a refuse channel command is received at the channel change module 218.

The memory device 206 also includes one or more image and data control modules, such as the image and data control module 222. In a particular embodiment, the memory device 206 can include one or more modules to receive and process images and one or more modules to receive and process data. In the embodiment illustrated in FIG. 2, a single image and data control module 222 receives and processes images and data. The image and data control module 222 can be configured to communicate with the private IPTV access network 234 via the network interface 208 to receive a still image associated with a program of a selected channel and to receive data related to the selected channel, which may include data related to the program or a future program. In an illustrative embodiment, the image and data control module 222 can be configured to communicate the still image and data to a graphical user interface module 224.

In a particular embodiment, the graphical user interface module 224 can be configured to communicate with the image and data control module 222 to receive a still image associated with a program and data related to a selected channel. Additionally, the graphical user interface module 224 can include instructions to generate a graphical user interface (GUI) that includes the still image and data. The GUI is illustrated further with reference to FIGS. 5-6.

Further, the graphical user interface module 224 can be configured to transmit a data signal or other signal corresponding to the GUI to the display interface 210. In a particular embodiment, the GUI can also include one or more indicators of selectable options. The graphical user interface module 224 can be configured to communicate with the remote control device 238, for example, to receive selections of option indicators and to issue commands or signals corresponding to the selected option indicators to other devices or modules within the set-top box device 202.

For example, the graphical user interface module 224 can receive a selection of a digital video recorder (DVR) programming option indicator. In one embodiment, the graphical user interface module 224 can be configured to transmit one or more prompts to the display device 212 requesting a program to be recorded, a begin recording instruction, a recording start time, a recording end time, or other information or instructions suitable to schedule a DVR to record one or more programs of the selected channel. The graphical user interface module 224 can issue one or more commands or signals to a DVR control module 228 corresponding to the information or recording instructions. Alternatively, the graphical user interface module 224 can issue one or more commands or signals to the processor 204 or DVR module 228, such that the DVR control module 228 receives the information or recording instructions from the remote control 238. The DVR control module 228 can be configured to issue programming commands to the DVR 214 to record the designated program at the scheduled time. Where a user designates a video-on-demand (VOD) program, the DVR control module 228 can instruct the DVR 214 to begin recording the VOD program immediately.

In another embodiment, the graphical user interface module 224 can receive a selection of a notification option indicator. The graphical user interface module 224 can be configured to transmit one or more prompts to the display device 212 requesting a designated program, a time before a scheduled start time of the program, or other information or suitable to schedule a notification before or when the designated program is to be displayed at the selected channel. The graphical user interface module 224 can issue one or more commands or signals to a notification module 230 corresponding to the designated program or other information. Alternatively, the graphical user interface module 224 can issue one or more commands or signals to the processor 204 or the notification module 230, such that the notification module 230 receives the designated program or other information from the remote control 238. The notification module 230 may output an audible or graphical notification via a speaker or display coupled to or integrated with the set-top box device 202, or at the display device 212, before or at the scheduled start time of the designated program.

In a particular embodiment, the graphical user interface module 224 can receive a selection of an auto-change option indicator. The graphical user interface module 224 can be configured to transmit one or more prompts to the display device 212 requesting a designated program, a time before a scheduled start time of the program, or other information necessary to automatically change to a channel displaying the designated program. The graphical user interface module 224 can issue one or more commands or signals to the channel change module 218, such that the channel change module 218 issues a selection of the channel to the IPTV system via the private IPTV access network 234 at the designated time before the scheduled start time of the program. Alternatively, the graphical user interface module 224 can issue one or more commands or signals to the processor 204 or the channel change module 218, such that the channel change module 218 receives the designated program or other information from the remote control 238 and issues a selection of the channel displaying the designated program at the designated time.

In another embodiment, the graphical user interface module 224 can receive a selection of a search option indicator. The graphical user interface module 224 can be configured to issue a search command to the search module 232. The search module 232 can be configured to retrieve a list or other information corresponding to channels that display video content similar to video content of the selected channel. The search module 232 can retrieve the other channel information from channel listings or other data stored at the memory device 206; from information stored at one or more servers at the IPTV system; or through a combination of information stored at the memory device 206 and the IPTV system. The search module 232 can be configured to transmit the list of channels having similar video content to the display device 212, via the display interface 210. Alternatively, the graphical user interface module 224 can be configured to receive data corresponding to the channels from the search module 232 and to generate a user interface showing the channels. In a particular embodiment, the graphical user interface module 224 can be configured to receive a selection of a channel from the list and to issue a selection of the channel to the channel change module 218.

The set-top box device 202 includes a video content and buffer module 226. The video content and buffer module 226 can be configured to receive video content of a selected channel and to output the video content to a display device 212 via the display interface 210. In an illustrative embodiment, the video content and buffer module 226 can include a buffer that receives the video content. The video content and buffer module 226 can be configured to transmit the video content to the display interface 210 after the video content within the buffer exceeds a designated portion of the buffer. The video content and buffer module 226 can also be configured to transmit a command or signal to the graphical user interface module 224 to cease transmission of the GUI to the display device 212, when the video content and buffer module 226 transmits the video content. In an illustrative embodiment, the video content and buffer module 226 can be configured to empty the buffer of video content when a selection of a channel or a refuse channel command is received at the channel change module 218.

Figure 3:
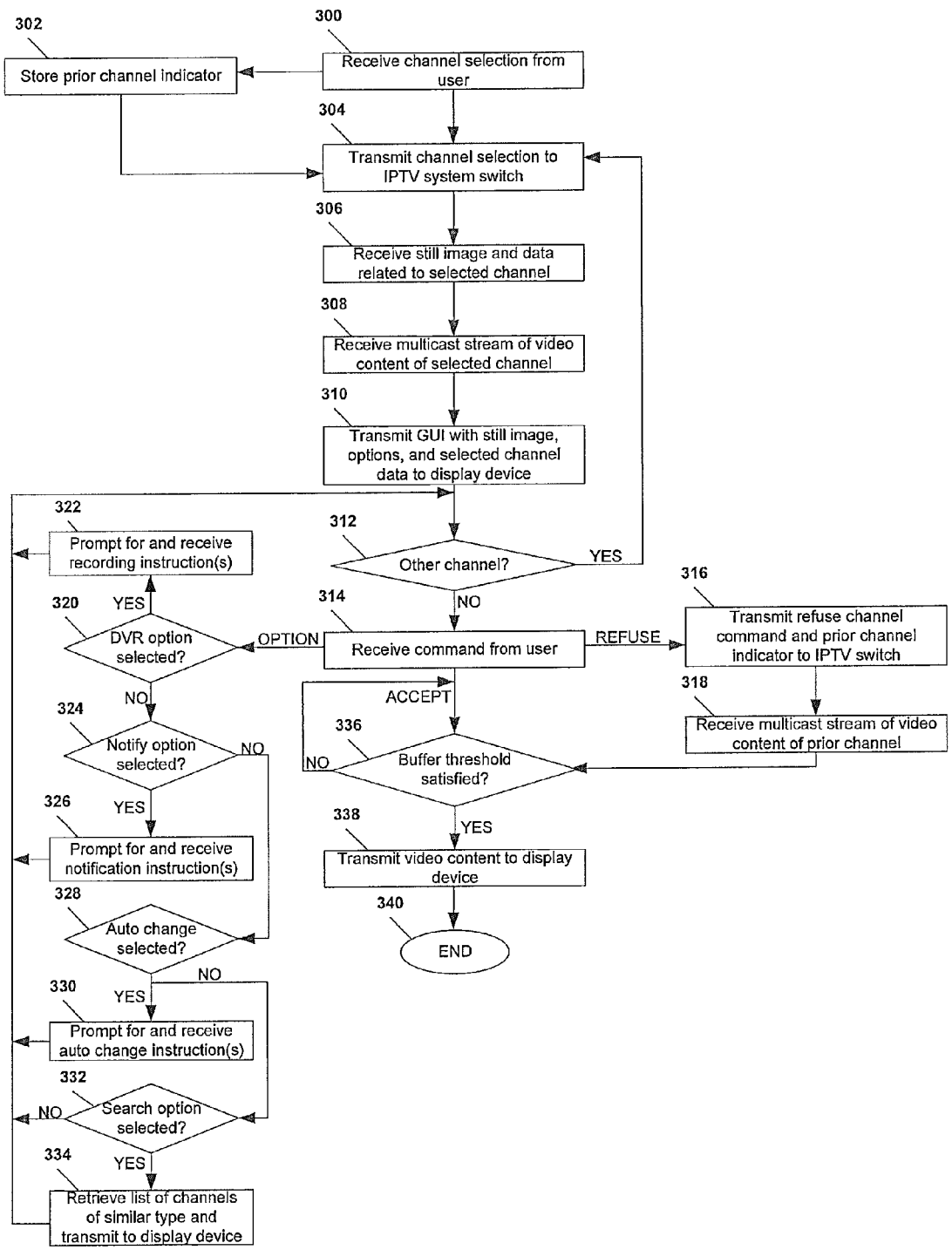
FIG. 3 is a flow diagram illustrating an embodiment of a method of communicating video content.

Referring to FIG. 3, a particular illustrative embodiment of a method of communicating video content is disclosed. At block 300, a selection of a channel is received at a set-top box device from a user. The user can issue the selection, for example, from a remote control device using a channel up key, channel down key, one or more number keys, a favorite channel key, a previous channel key, any other suitable key, or any combination thereof. Alternatively, the user can issue the channel selection using one or more keys disposed on the set-top box device. In a particular embodiment, the method can move to block 302, and the set-top box device can store an indicator of the channel that was displayed prior to the channel selection.

Proceeding to block 304, the set-top box device transmits the channel selection to an Internet Protocol Television (IPTV) system. In an illustrative embodiment, the set-top box device can transmit the channel selection to an IPTV component, such as a switch, via a private access network. Continuing to block 306, the set-top box device receives a still image associated with a program of the selected channel from the IPTV system. The set-top box device also receives data related to the selected channel from the IPTV system, which can include data related to the selected channel, a program of the selected channel, a future program of the selected channel, or a combination thereof. Moving to block 308, the set-top box device receives a multicast stream of video content of the selected channel. In an illustrative embodiment, the set-top box device can receive the video content into a buffer.

Advancing to block 310, the set-top box device transmits a graphical user interface (GUI) to a display device coupled to the set-top box device. In a particular embodiment, the GUI can include the still image and data received from the IPTV system. Additionally, the GUI can include one or more indicators of selectable options, such as DVR programming options, program notification options, automatic channel change options, and channel search options. In an illustrative embodiment, the option indicators can be soft buttons within a region displaying the data related to the selected channel. Moving to decision step 312, it is determined whether a selection of another channel is received at the set-top box device. If another channel is selected, the method returns to block 304. Conversely, if another channel is not selected, the method continues to block 314.

Proceeding to block 314, a command is received at the set-top box device from the user. The command can include an accept channel command, a refuse channel command, or a selection of an option indicator of the GUI. The command can be issued using keys on a remote control or on the set-top box device. Alternatively, the command can be issued by manipulating a cursor or highlight bar to select soft buttons corresponding to the command on the GUI.

If the set-top box device receives a refuse channel command, at block 314, the method moves to block 316, and the set-top box device can transmit the refuse channel command to the IPTV system. In a particular embodiment, the set-top box device can transmit the prior channel indicator stored at block 302 with the refuse channel command. In another embodiment, the set-top box device can issue a selection of the prior channel to the IPTV system via the IPTV switch, in response to the refuse channel command. Continuing to block 318, the set-top box receives a multicast stream of video content of the prior channel. In an illustrative embodiment, the set-top box device may initialize the buffer, such that video content of the selected channel is emptied from the buffer when the selected channel is refused. The method then proceeds to decision step 336 and it is determined whether the video content of the prior channel satisfies the buffer threshold. After the video content of the prior channel exceeds a portion of the buffer that is suitable to prevent underflow, the method advances to block 338, and the set-top box device transmits the video content of the prior channel to the display device.

Returning to block 314, if the command is a selection of an option indicator, the method moves to decision step 320. In a particular embodiment, at decision step 320, it is determined whether a selection of a DVR programming option indicator has been received at the set-top box device. If a selection of the DVR programming indicator is received, the method moves to block 322, and one or more recording instructions are received at the set-top box device in response to one or more prompts that are transmitted to the display device. The method then returns to decision step 310. The recording instructions can include, for example, a program title, a begin recording instruction, a recording start time, a recording end time, or other information or instructions suitable for scheduling a DVR to record one or more programs of the selected channel. The DVR can be located within the set-top box device or at a server of the IPTV system. Where the DVR is located at a server of the IPTV system, the set-top box device can transmit the recording instructions to the IPTV system via a private access network.

Returning to decision step 320, if a selection of a DVR programming option indicator has not been received, the method moves to decision step 324. At decision step 324, it is determined whether a selection of a notification programming option indicator has been received at the set-top box device. If a selection of a notification programming option indicator has been received, the method proceeds to block 326, and one or more notification instructions are received at the set-top box device in response to one or more prompts that are transmitted to the display device. The method then returns to decision step 310. The notification instructions can include, for example, a program title, a notification time, a notification type, such as an audible or graphical notification, or other information or instructions suitable for scheduling a notification to be issued by the set-top box device at or before a scheduled start time of a program of the selected channel.

Returning to decision step 324, if a selection of a notification programming option indicator has not been received, the method moves to decision step 328. At decision step 328, it is determined whether a selection of an automatic channel change option indicator has been received at the set-top box device. If a selection of an automatic channel change option indicator has been received, the method proceeds to block 330, and one or more automatic channel change instructions are received at the set-top box device in response to one or more prompts transmitted to the display device. The method then returns to decision step 310. The automatic channel change instructions can include, for example, a program title, a channel change time, a channel indicator, or other information or instructions suitable for scheduling the set-top box device to issue a selection of a channel to the IPTV system at or before a scheduled start time of a program of the selected channel.

Returning to decision step 328, if an automatic channel change option indicator has not been received, the method moves to decision step 332. At decision step 332, it is determined whether a selection of a channel search option indicator has been received at the set-top box device. If a selection of a channel search option indicator has not been received, the method returns to block 310. Conversely, if a selection of a channel search option indicator has been received, the method proceeds to block 334, and a list of channels that display video content or programs of a type similar to the video content or programs of the selected channel is transmitted to the display device. The list of channels can be retrieved from a memory within the set-top box device or from one or more servers at the IPTV system. The method then returns to decision step 310.

Returning to block 314, if the command is an accept channel command, the method continues to decision step 336, and it is determined whether the video content of the selected channel that is received at the set-top box device via the multicast stream has exceeded a portion of the buffer within the set-top box device. After the buffer threshold is satisfied, the method proceeds to block 338, and the set-top box device transmits the video content to the display device. The method terminates at 340.

Figure 4:
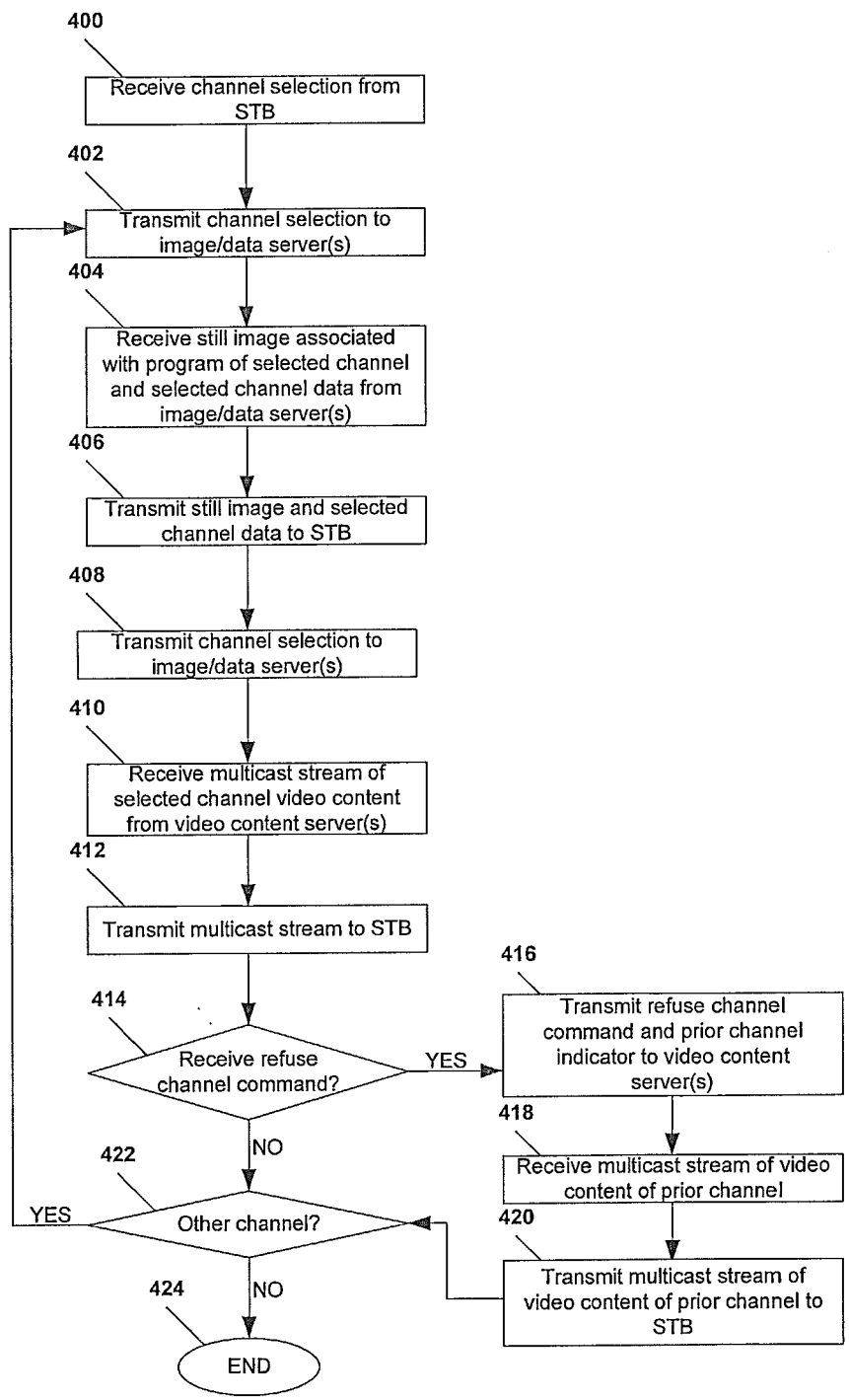
FIG. 4 is a flow diagram illustrating an embodiment of a method of providing video content.

Referring to FIG. 4, an embodiment of a method of providing video content is illustrated. At block 400, a selection of a channel is received at a switch of an IPTV system from a set-top box device. The switch can be, for example, an IP data router or a client-facing tier switch, such as that illustrated in FIG. 1. In one embodiment, the channel selection can be received from the set-top box device via a private access network. Continuing to block 402, the switch transmits the channel selection to one more image and data server(s) of the IPTV system. In a particular embodiment, the image and data server(s) can include a cluster of servers, each of which stores still images associated with programs, data related to channels and to programs of the channels, or a combination thereof.

Proceeding to block 404, the switch receives a still image associated with a program of the selected channel from the image and data server(s). Additionally, the switch receives data related to the selected channel. The data can include data related to the channel, one or more programs of the selected channel, or a combination thereof. Advancing to block 406, the switch transmits the still image and the data to the set-top box device.

In a particular embodiment, at block 408, the switch transmits the selection of the channel to one or more video content servers of the IPTV system, such as a multicast server. Moving to block 410, the switch receives a multicast stream of video content of the selected channel from the video content server(s). Advancing to block 412, the switch transmits the multicast stream to the set-top box device via the private access network.

Continuing to decision step 414, it is determined whether the switch receives a refuse channel command from the set-top box device. If a refuse channel command is received at decision step 414, the method moves to block 416, and the refuse channel command is transmitted to the video content server(s). In an illustrative embodiment, a prior channel indicator can also be transmitted to the video content server. Proceeding to block 418, the switch receives a multicast stream of video content of the prior channel. The method then advances to block 420, and the multicast stream of video content of the prior channel is transmitted to the set-top box device. The method then moves to decision step 422 and continues as described.

Returning to decision step 414, if a refuse channel command is not received, the method proceeds to decision step 422. At decision step 422, it is determined whether a selection of another channel is received. If a selection of another channel is received, the method returns to block 402. Conversely, if a selection of another channel is not received, the method terminates at 424.

Though the aspects of the disclosed methods have been presented in a certain order, for ease of description, certain portions of the method may be performed in a different order or simultaneously. For example, the multicast stream can be received at the set-top box device simultaneously with the still image and data related to the selected channel. In addition, it can be determined simultaneously which indicator of selectable options have been selected, if any.

Figure 5:
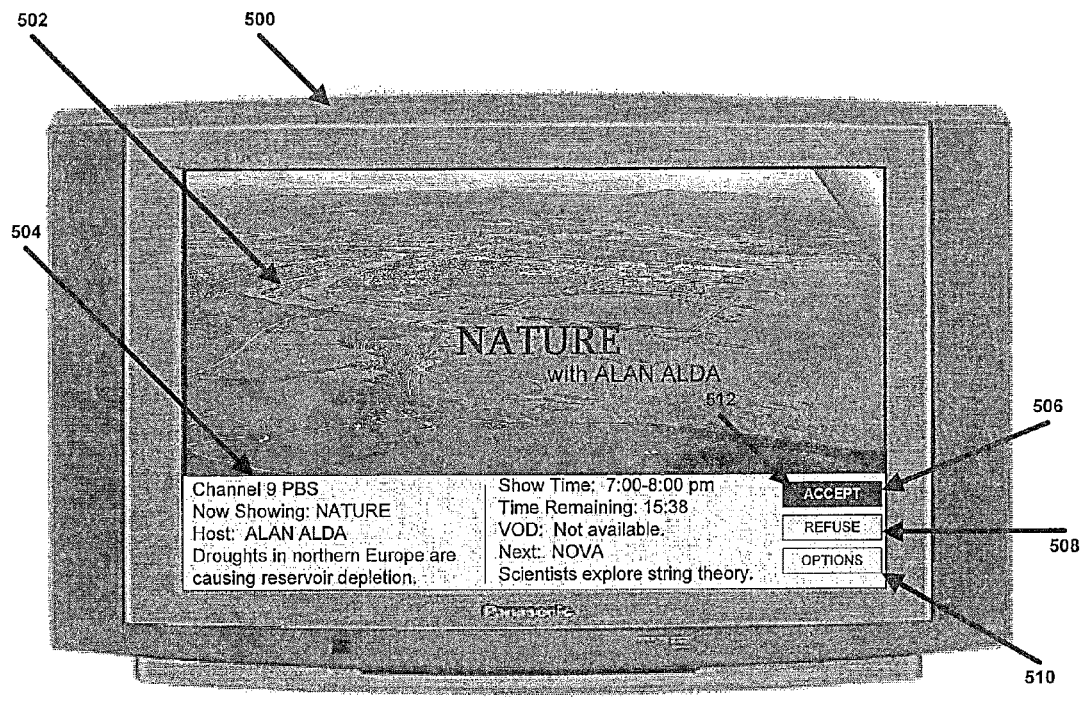
FIG. 5 is a diagram illustrating an embodiment of a graphical user interface (GUI) to provide video content related to a selection of a channel.

Referring to FIG. 5, an embodiment of a graphical user interface (GUI) to provide video content related to a selection of a channel is illustrated. The GUI can be displayed on a display device 500, such as a television monitor. In a particular embodiment, the GUI can include a still image region 502 that displays a still image associated with a program of a selected channel. Still images can be associated with a television program or a channel on a one-to-one basis; with multiple programs on a single channel on a one-to-many basis; or with one or more programs on multiple channels.

The GUI can also include a data region 504 that displays data related to the selected channel, programs of the selected channel, or a combination thereof. In an illustrative embodiment, the data region 504 can at least partially overlay the still image region 502. The data displayed in the data region 504 can include a channel identifier, such as Channel 9; or a network identifier, such as PBS. The data can also include data related to current or future programs on the channel, e.g., a program name, such as a program title or episode name; a type of program, such as a news program, a science program, or a sports program; a program audience rating, such as general audience (G), parental guidance (PG), restricted (R), or mature audiences (MA); an elapsed program time, such as eleven minutes; a remaining program time, such as forty-nine minutes; a program start time, such as 7:00 pm; a program end time, such as 8:00 pm; a program summary or synopsis; a main actor name, such as Jerry Seinfeld; a program host name, such as a game show host name, a talk show host name, or a documentary narrator name; a program viewership, such as a number of households viewing the program; a video-on-demand availability indicator; or any combination thereof.

In a particular embodiment, the GUI can also include one or more indicators of selectable commands 506, 508, 510. The indicators can include, for example, an accept channel command indicator 506, a refuse channel command indicator 508, an options indicator 510, or a combination thereof. In an illustrative embodiment, the indicators can be selected by manipulating a cursor or a highlight bar 512.

Figure 6:
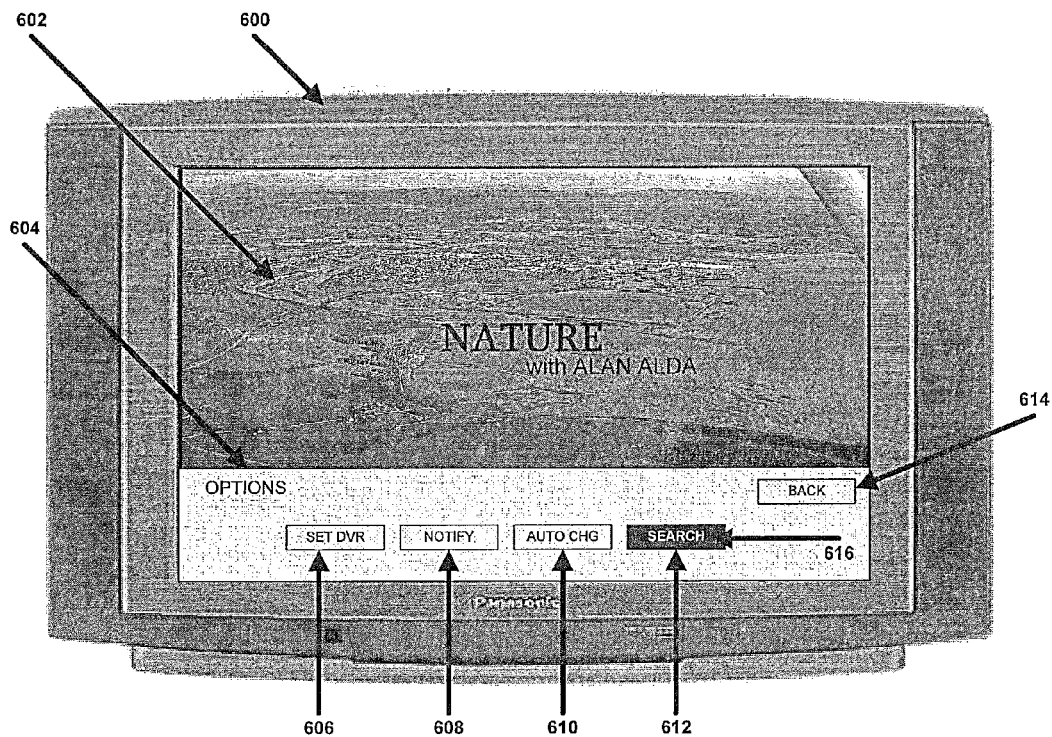
FIG. 6 is a diagram illustrating a second embodiment of a graphical user interface (GUI) to provide video content related to a selection of a channel.

Referring to FIG. 6, a second embodiment of a graphical user interface (GUI) to provide video content related to a selection of a channel is illustrated. The GUI can be displayed on a display device 600, such as a television monitor. In a particular embodiment, the GUI can include a still image region 602 that displays a still image associated with a program of a selected channel. The GUI also includes an options region 604 that displays indicators 606-614 corresponding to one or more selectable options. In an illustrative embodiment, the options region 604 can be displayed or incorporated within the data region 504 described with reference to FIG. 5.

As illustrated in FIG. 6, the options region 604 can include an indicator 606 corresponding to a DVR programming option. Additionally, the options region 604 can include an indicator 608 corresponding to a program notification option. Further, the options region 604 can include an indicator 610 corresponding to an automatic channel change option. Moreover, the options region 604 can include an indicator 612 corresponding to a channel search option. In a particular embodiment, the options region 604 can include an indicator 614 corresponding to a go back option, which can indicate an option to return to a previous screen of the GUI. In an illustrative embodiment, the indicators 606-614 can be selected by manipulating a highlight bar 616.

Figure 7:
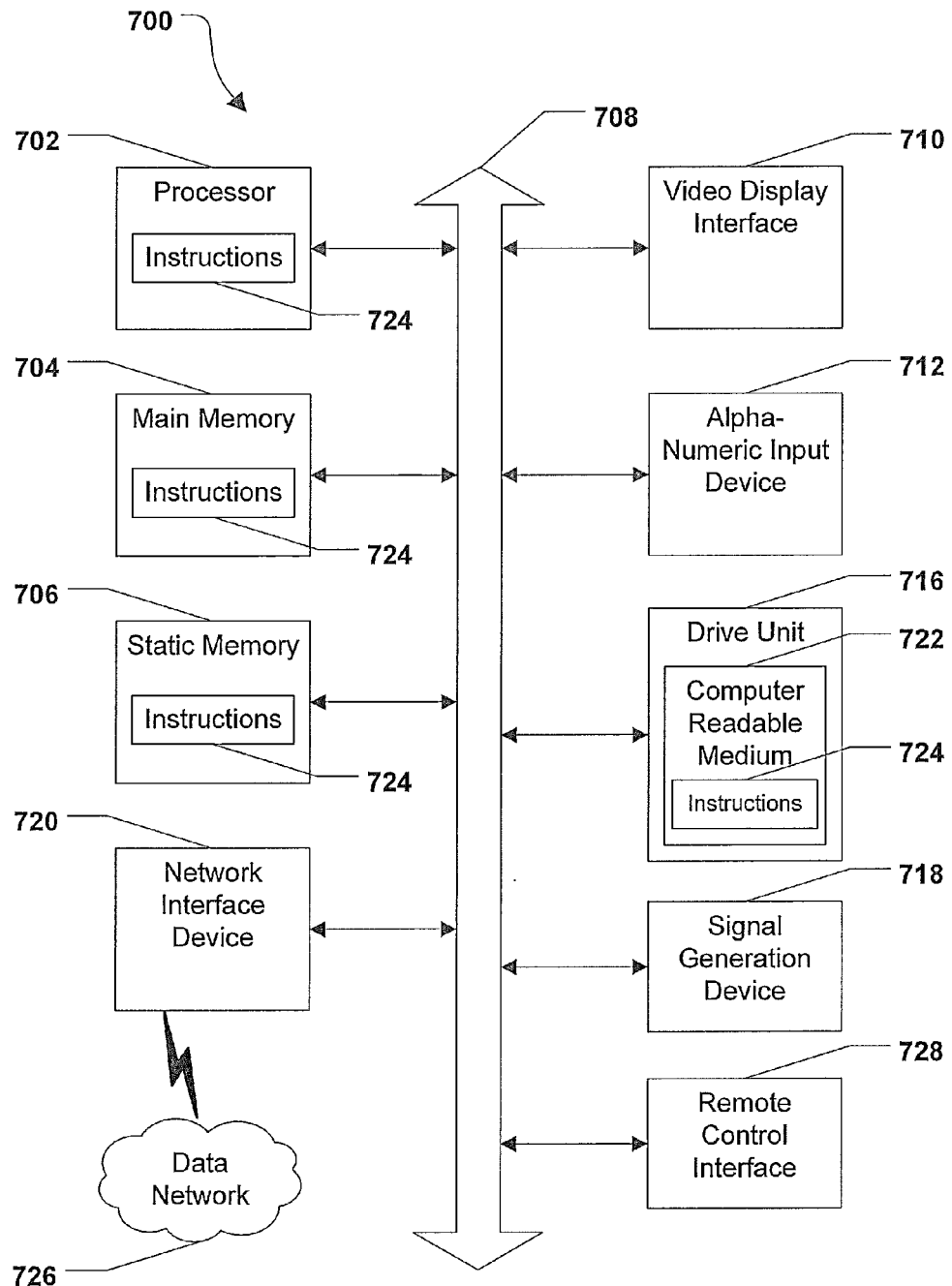
FIG. 7 is a diagram of an embodiment of a general computer system.

Referring to FIG. 7, an illustrative embodiment of a general computer system is shown and is designated 700. The computer system 700 can include a set of instructions that can be executed to cause the computer system 700, or a portion thereof, to perform any one or more of the methods or computer based functions disclosed herein in connection with the set-top box device or with a network device. The computer system 700, or any portion thereof, may operate as a standalone device or may be a hardware or software module within a server, switch or set-top box device, as illustrated in FIGS. 1 and 2.

In a networked deployment, the computer system may operate in the capacity of an IPTV switch or set-top box device. The computer system 700 can also be implemented as or incorporated into various other devices, or any other machine capable of executing a set of instructions (sequential or otherwise) that specify actions to be taken by that machine. In a particular embodiment, the computer system 700 can be implemented using electronic devices that provide audio, video or data communication. Further, while a single computer system 700 is illustrated, the term "system" shall also be taken to include any collection of systems or sub-systems that individually or jointly execute a set, or multiple sets, of instructions to perform one or more computer functions, such as the IPTV system illustrated in FIG. 1.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a remote control input, an input control panel, a keyboard, a mouse, a gaming station input, or one or more keys disposed on a set-top box device. The computer system 700 can also include a disk drive unit 716, a signal generation device 718, such as a speaker, and a network interface device 720.

In an illustrative embodiment, the computer system 700 can include a remote control interface 728, such as the remote control interface of a set-top box device illustrated in FIG. 2. The remote control interface 728 can receive inputs from a remote control device.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate audio, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed provide a still image associated with a program of a selected channel and data related to the selected channel and/or program, in response to a selection of a channel. In a particular embodiment, when a user issues a selection of a channel to a set-top box device using buttons on a remote control or on the set-top box device, a still image associated with a program of the selected channel is displayed as a background picture and some data related to the selected channel or program is displayed in the foreground. Users may spend 2-4 seconds, for example, scanning the data on the screen before the user decides to accept the selected channel, return to a prior channel, or select another channel. The time period in which the user scans the data can be used to push a multicast stream of video content of the selected channel to the set-top box device, building up the buffer before the video content is transmitted to the display device coupled to the set-top box device. In one embodiment, the video content can be transmitted to the display device, when it exceeds a portion of the buffer. In another embodiment, the video content can be transmitted to the display device, when the user issues an accept channel command to the set-top box device.

In a particular embodiment, the system and method can provide advantages over other channel change methods, by reducing hardware and bandwidth requirements. For example, high numbers of D-servers are not needed in each video head-end office to encode unicast streams of video content and send them to individual set-top box devices. Additionally, the high amount of bandwidth needed to distribute all current channels to individual customers is reduced by the use of multicast streams.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a selection of a channel at the set-top box device;
   receiving a still image associated with a program from a first source, the program associated with the channel; and
   in response to the selection of the channel:
      transmitting data corresponding to a graphical user interface to the display device, wherein the graphical user interface includes the still image, an accept channel command indicator, and a refuse channel command indicator; and
      receiving, from a second source, a multicast stream of video content associated with the channel at the set-top box device, wherein at least a portion of the multicast stream is received while the still image is displayed at the display device, and wherein the first source is different from the second source,
      wherein the video content is transmitted to the display device in response to receiving a selection of the accept channel command indicator, and wherein other content is transmitted to the display device in response to receiving a selection of the refuse channel command indicator.

2. The method of claim 1, wherein the still image is received from an image server of an internet protocol television system and the multicast stream is received from a video content server of the internet protocol television system.

3. The method of claim 1, wherein the still image is selected from a plurality of still images.

4. The method of claim 3, wherein each of the plurality of still images corresponds to a different program available via the channel.

5. The method of claim 1, wherein the still image is further associated with a second program available via the channel.

6. The method of claim 1, wherein the program is further available via a second channel that is different from the channel.

7. The method of claim 1, wherein the graphical user interface further includes an indicator of the channel.

8. The method of claim 7, wherein the indicator of the channel includes a channel identifier, a network identifier, a program name, a type of program, a program audience rating, an elapsed program time, a remaining program time, a program start time, a program end time, a program summary, an actor name, a program host name, a program viewership, a video-on-demand availability indicator, or any combination thereof.

9. The method of claim 1, wherein the selection of the channel is made using a next channel command, a previous channel command, a channel number input, a selection from a channel menu, a selection from a channel list, a selection from a program guide, or any combination thereof.

10. The method of claim 1, wherein the multicast stream is transmitted to the set-top box device via at least one internet protocol multicast-enabled router.

11. A set-top box device, comprising:
    a video content controller configured to:
    receive, from a first source, a multicast stream of video content associated with a channel, wherein at least a portion of the multicast stream is received while a still image is displayed at a display device;

transmit the video content to the display device in response to receiving a selection of an accept channel command indicator; and transmit other content to the display device in response to receiving a selection of a refuse channel command indicator;

an image controller configured to receive, from a second source, the still image associated with a program of the channel, wherein the first source is different from the second source; and a graphical user interface circuit configured to:

generate a graphical user interface that includes the still image, the accept channel command indicator, and the refuse channel command indicator; and transmit the graphical user interface to the display device in response to receiving a selection of the channel.

12. The set-top box device of claim 11, wherein the set-top box device is coupled to a switch of an internet protocol television system.

13. The set-top box device of claim 11, wherein the graphical user interface includes data related to the channel.

14. The set-top box device of claim 11, wherein the image controller, the video content controller, the graphical user interface circuit, or any combination thereof are stored within a shared memory device.

15. The set-top box device of claim 11, wherein the image controller, the video content controller, the graphical user interface control module, or any combination thereof are executable by a processor.

16. The set-top box device of claim 11, wherein the graphical user interface circuit is further configured to determine a type of programming associated with the channel and to identify at least one other channel having a substantially similar type of programming.

17. A computer-readable memory device comprising instructions, that when executed by a processor, cause the processor to:

receive a selection of a channel at a set-top box device;

receive a still image associated with a program from a first source, the program associated with the channel; and in response to the selection of the channel:

transmit data corresponding to a graphical user interface to a display device, wherein the graphical user interface includes the still image, an accept channel command indicator and a refuse channel command indicator; and receive, from a second source, a multicast stream of video content associated with the channel at the set-top box device, wherein at least a portion of the multicast stream is received while the still image is displayed at the display device, and wherein the first source is different from the second source, wherein the video content is transmitted to the display device in response to receiving a selection of the accept channel command indicator, and wherein other content is transmitted to the display device in response to receiving a selection of the refuse channel command indicator.

18. The computer-readable memory device of claim 17, wherein the still image is associated with the second program on a one-to-one basis.

19. The computer readable memory device of claim 17, wherein the still image is selected from a plurality of still images.

20. The computer readable memory device of claim 19, wherein each of the plurality of still images corresponds to a different program available via the channel.

* * * * *